United States Patent [19]
Wolcott

[11] Patent Number: 4,492,444
[45] Date of Patent: Jan. 8, 1985

[54] CAMERA MECHANISM

[75] Inventor: Dana W. Wolcott, Brockport, N.Y.

[73] Assignee: Eastman Kodak Company, Rochester, N.Y.

[21] Appl. No.: 500,507

[22] Filed: Jun. 2, 1983

[51] Int. Cl.$^3$ .............................................. G03B 17/42
[52] U.S. Cl. .................... 354/121; 354/203; 354/204; 354/266
[58] Field of Search ............... 354/121, 203, 204, 205, 354/206, 251, 266, 267.1, 268, 288

[56] References Cited

U.S. PATENT DOCUMENTS

| | | | |
|---|---|---|---|
| 2,625,087 | 1/1953 | Steineck | 354/121 |
| 4,202,614 | 5/1980 | Harvey | 354/121 |
| 4,290,676 | 9/1981 | Hozman et al. | 354/121 |
| 4,309,096 | 1/1982 | Sethi | 354/203 |
| 4,361,387 | 11/1982 | Cloutier | 354/43 |
| 4,449,806 | 5/1984 | Wong | 354/121 |

OTHER PUBLICATIONS

Research Disclosure, Mar. 1982, Industrial Opportunities Ltd., pp. 97-98; 100-101, Havant, England.

Primary Examiner—A. A. Mathews
Attorney, Agent, or Firm—Robert L. Randall

[57] ABSTRACT

A disk film camera which is of simple, compact and inexpensive construction and yet which provides one-button operation to locate the film, expose the film, disengage the film and advance the next frame. The camera requires no separate operation to initialize a cartridge when it is loaded into the camera. A photographer is free to change his mind about taking a picture at any time after moving the shutter button until the shutter is actually released, without adversely affecting the operation of the camera, such as by jamming it or by placing any component of the camera (such as a spring) in a stressed condition for an indeterminate period of time.

8 Claims, 11 Drawing Figures

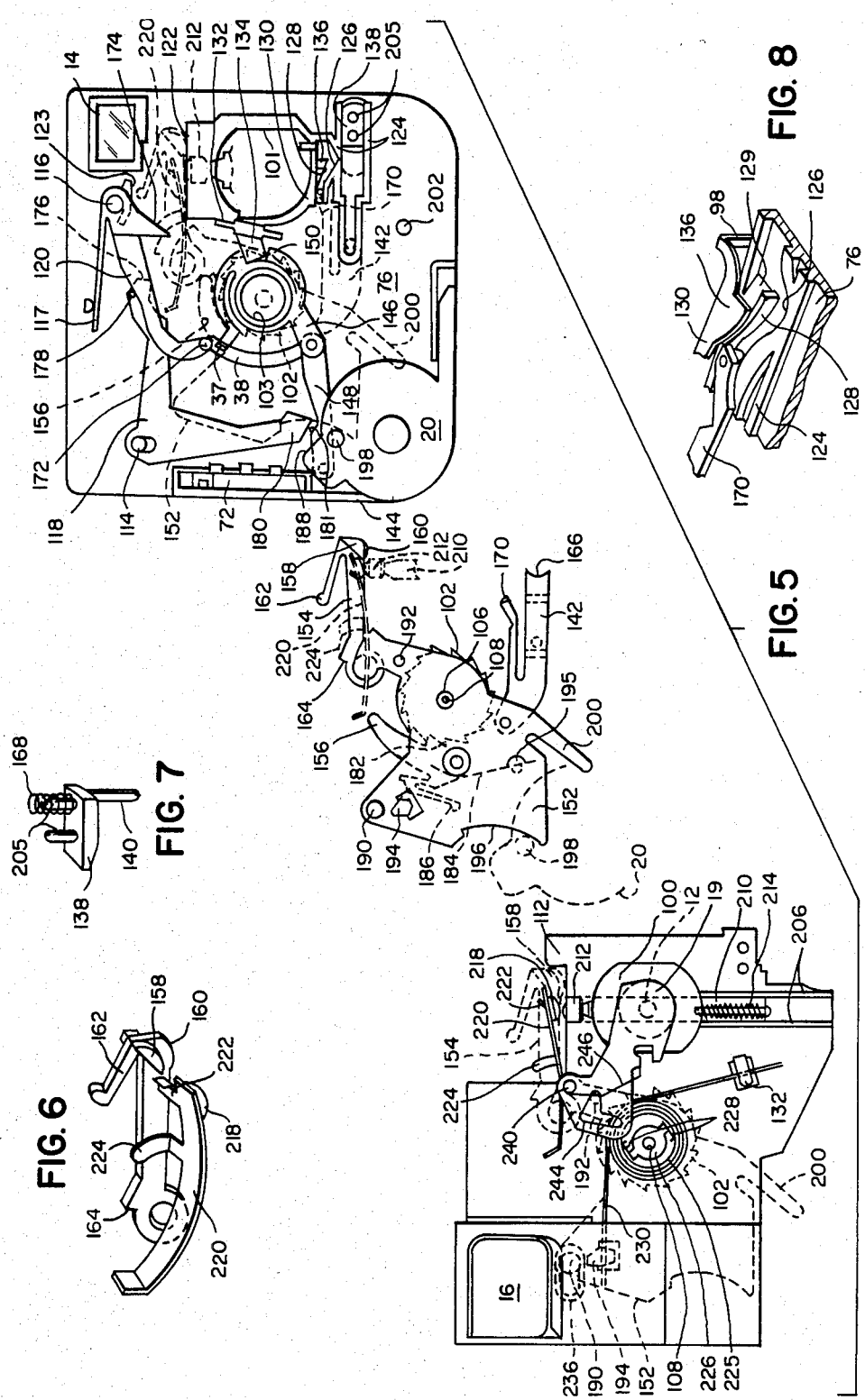

CAMERA MECHANISM

BACKGROUND OF THE INVENTION

1. Field of the Invention

The present invention relates to manually actuated cameras in which an operating member serves as the sole manually actuated member to cock the shutter, to locate the film for exposure, to release the shutter, and then to advance the film.

2. Description of the Prior Art

Cameras for use with a film disk have recently been introduced into the market by Eastman Kodak Company incorporating a motor drive which is energized by the operator to locate, expose and advance the film. This camera/film combination provides the consumer with unprecedented convenience in that the operation is totally automated and the physical size permits ready pocketability. One example of the structure of such a camera is found in U.S. Pat. No. 4,361,387 issued in the name of R. Cloutier. Although such cameras are very convenient to operate, the complexity of the mechanism and the cost of the motor control and the motor itself tend to make the cameras relatively expensive to produce.

Other cameras have been devised for use with disk film which are simpler in construction and operation, utilizing manual operations for film location, exposure and advance. One such camera is described in U.S. Pat. No. 4,202,614, which illustrates a manually operated camera that provides substantially the same operational features of the Cloutier camera, but without the expense of a motor and its controls. However, this camera does not provide the convenience of one-button operation, requiring the operator to first actuate an exposure button, and subsequently to operate a film-advance lever to advance and locate the film for the next exposure.

Other examples of prior art cameras used with film disks are noted in the aforementioned U.S. Pat. No. 4,202,614 and include U.S. Pat. No. 2,625,087 which discloses a camera that utilizes a reloadable film cartridge assembly with film in the form of a disk. This camera permits one-button operation, actuating the shutter for film exposure and then advancing the film for the next exposure. However, this camera does not provide a mechanism for the accurate location of the film during exposure and for subsequent release to permit advancing the film for the next exposure. Thus, this camera does not provide sufficiently accurate film positioning to ensure high resolution photographs under all conditions.

Still other examples of prior art cameras for use with film disks are disclosed at pages 97–98 and 100–101 of the March 1982 issue of Research Disclosure published by Industrial Opportunities Ltd., Havant, England. These cameras are reasonably simple and compact, providing manual and one-button operation. Nevertheless, each of these cameras suffers from structural limitations that detract from the operating convenience for the customer. For example, one of these cameras suffer from the fact that the customer must first initialize the cartridge after loading, that is operate the actuating button without taking a picture, to bring the first frame of the film into the exposure position. This unnecessarily complicates the opertion of the camera and is to be avoided if possible. The other cameras disclosed by this publication are so arranged and constructed to permit partial initiation of the operating cycle and interruption of the cycle without actually taking a picture. Because of anti-back-up provisions necessary to prevent double exposure or double frame advancement, these arrangements undesirably necessitate that the mechanism be left in an intermediate position with portions under stress for some indeterminate period of time.

SUMMARY OF THE INVENTION

Accordingly, the present invention provides a disk film camera which is of simple, compact and inexpensive construction and yet which provides one-button operation to locate the film, expose the film, disengage the film and advance the next frame. This arrangement requires no separate operation to initialize a cartridge when it is loaded into the camera while permitting the photographer the freedom to change his mind about taking a picture at any time after moving the actuating button until the actuating button has been depressed sufficiently to cause the shutter to be actually released, without adversely affecting the operation of the camera, such as by jamming it or by placing any component of the camera (such as a spring) in a condition that it will be stressed for an indeterminate period of time.

According to one aspect of the present invention a disk camera is provided having a shutter, cockable and releasable shutter actuating means, film advancing means, and a film locating means movable between a film locating position and a film releasing position. A release member is arranged for movement in opposite first and second directions. When moved in the first direction, the release member is arranged to first cock the shutter actuating means and to move the film locating means into the film locating position and then to release the shutter actuating means to actuate the shutter. When the release member is moved in the second direction, it moves the film locating means into the film releasing position and then actuates the film advancing means.

Further, the present invention provides a camera having a film chamber arranged to receive a film element, a shutter means, a film advance pawl, a metering member and a platen pressure member, both movable between first positions and second positions. The first position of the platen pressure member is a film locating position and the second position is a film releasing position. The first position of the metering member is a film engaging position and the second position is a film disengaging position. A film advance means is arranged to move a film element in the film chamber. A release member is supported for movement in opposite first and second directions and is operatively connected to the shutter means and the platen pressure member. The release member is operatively connected to the shutter means and the platen pressure member for moving the platen pressure member into the first position and then for actuating the shutter means when the release member is moved in the first direction. Means is provided connecting the release member to the metering member for moving the metering member and the platen pressure member into the second positions when the release member is moved in the second direction after actuation of the shutter means. The release member is also operatively connected to the film advance means for advancing the film after the platen pressure member and the metering member have moved to the second positions. After the film has started to advance, the release member then moves the metering member into the first position.

Still further, the present invention provides a disk camera having a film chamber arranged to receive a disk film element, a shutter means, a film advance pawl, and a metering member and a platen pressure member both movable between first positions and second positions. The first position of the platen pressure member is a film locating position, and the second position is a film releasing position. The first position of the metering member is a film engaging position, and the second position is a film disengaging position. A shutter actuating means is provided comprising a cockable and releasable high energy lever fixed at one end and having a shutter actuating portion at the opposite end. A cocking member includes cam means arranged to engage a first surface of the high energy lever while cocking the shutter actuating portion and to engage the opposite surface of the high energy lever after release of the shutter actuating portion. A film drive member is engageable by the film advance pawl and is arranged to rotatably move a disk film element in the film chamber. A sensing member normally urges the film advance pawl into engagement with the film drive member, but means is provided on the high energy lever for disengaging the sensing member from the film advance pawl as the high energy lever is being cocked. A release member is supported for movement in opposite first and second directions. The release member is operatively connected to the cocking member and to the platen pressure member for moving the cocking member in a first direction with respect to the high energy lever to cock the shutter actuating portion while moving the platen pressure member into the first position and then for releasing the high energy lever to actuate the shutter when the release member is moved in the first direction. The release member is operatively connected to the metering member for moving the platen pressure member and the metering member into the second positions when the release member is moved in the second direction after actuating the shutter. The release member is also operatively connected to the film advance pawl for engaging the drive member to advance the film after the platen pressure member and the metering member have moved to the second positions and then to move the metering member into the first position. Short stroke means is provided, effective after film advancement has commenced for engaging the cocking member to prevent movement of the release member in the first direction until completion of the movement of the release member in the second direction.

Various means for practicing the invention and other features and advantages thereof will be apparent from the following detailed description of illustrative preferred embodiments of the invention, reference being made to the accompanying drawings.

In The Drawings

FIG. 5 is an exploded front view of the camera shown in FIG. 1;

FIG. 6 is an enlarged perspective view of the high energy lever and the cocking member;

FIG. 7 is an enlarged perspective view of the platen pressure plunger member;

FIG. 8 is an enlarged perspective view of a portion of the metering pawl and the metering arm member, as well as the guide track and island;

DESCRIPTION OF THE ILLUSTRATIVE PREFERRED EMBODIMENTS

Although the present invention is applicable to various kinds of cameras, the illustrative embodiments are directed to cameras adapted to use disk film cartridges of the type disclosed in U.S. Pat. No. 4,309,096, entitled FILM CARTRIDGE ASSEMBLY WITH PRESSURE PLATE which issued in the name of G. S. Sethi.

General Description of Cartridge and Camera

Figure 1:
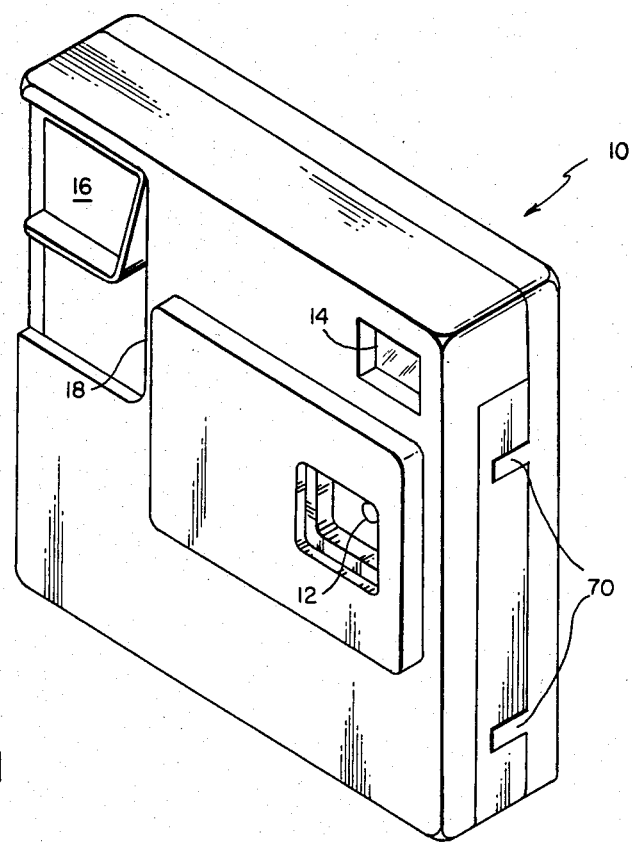
FIG. 1 is a front perspective view of a camera incorporating the invention depicting the camera in its normal operating position.
Figure 2:
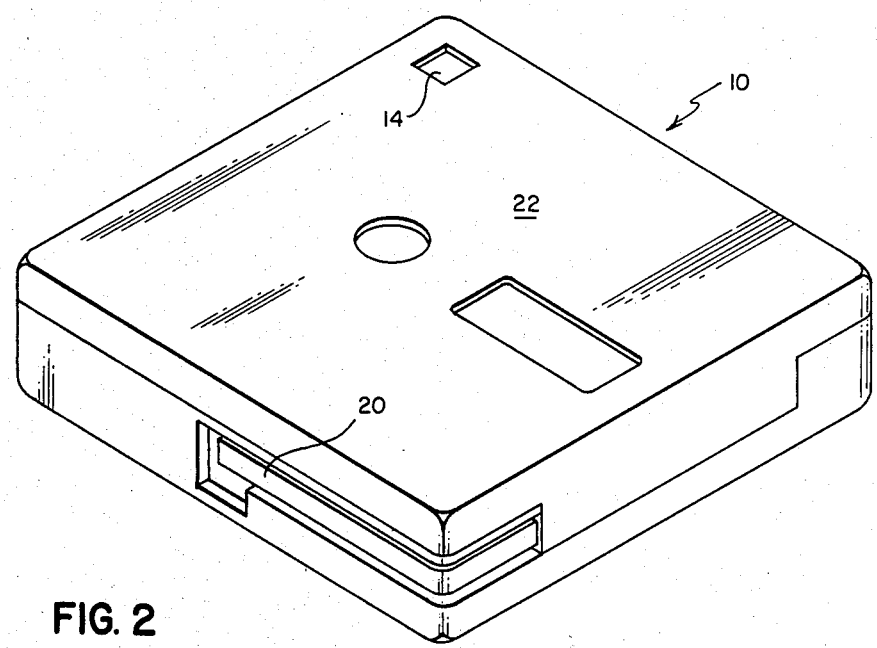
FIG. 2 is a rear perspective view of the camera shown in FIG. 1 depicting the camera in a horizontal, "face-down" position.

Referring now to the drawings and in particular to FIGS. 1 and 2, there is shown front and rear perspective views of a camera 10 incorporating the present invention. The camera comprises a body in the form of a relatively thin, generally square box. The camera front, shown in FIG. 1, includes a picture-taking lens 12, a viewfinder 14 and a shutter release button 16 movable vertically along a slot 18. Additionally, the camera can be provided with a movable lens cover door 19, (FIG. 5) as is well known in the art. As shown in FIG. 2, a door release lever 20, disposed in the bottom edge of the camera, is operable to unlatch a rear door 22 of the camera so that it may be opened for loading a film cartridge assembly into a receiving chamber, as will be more fully described hereinbelow.

Figure 3:
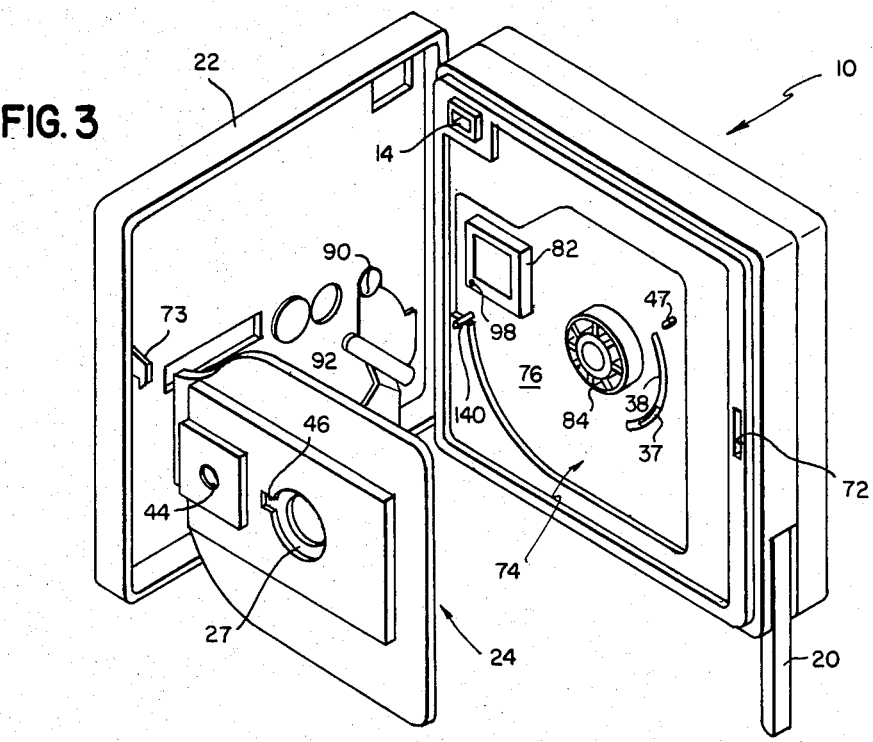
FIG. 3 is a rear perspective view of the camera shown in FIG. 1, depicting the loading door in an open position and showing a film cartridge in position for loading into the camera.
Figure 9:
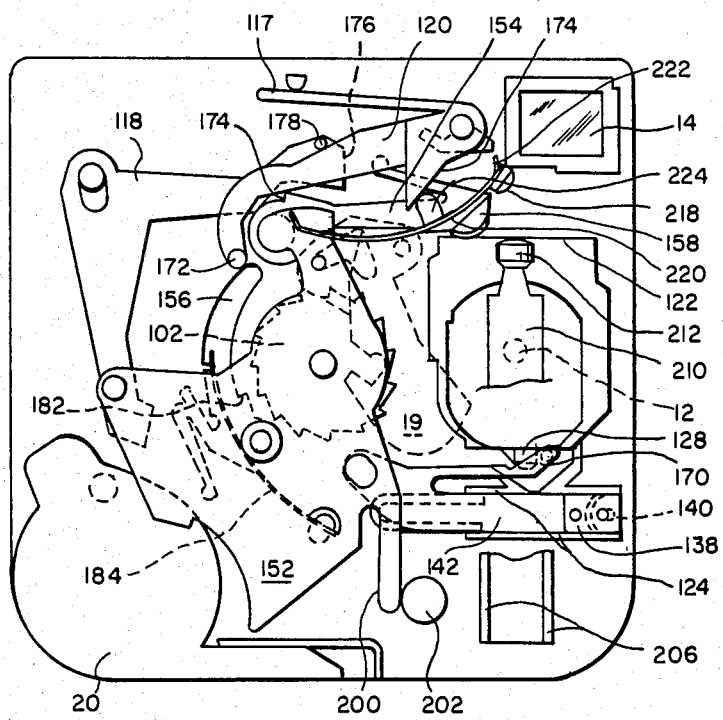
FIG. 9 is a view of a portion of the camera just prior to firing the shutter.
Figure 4:
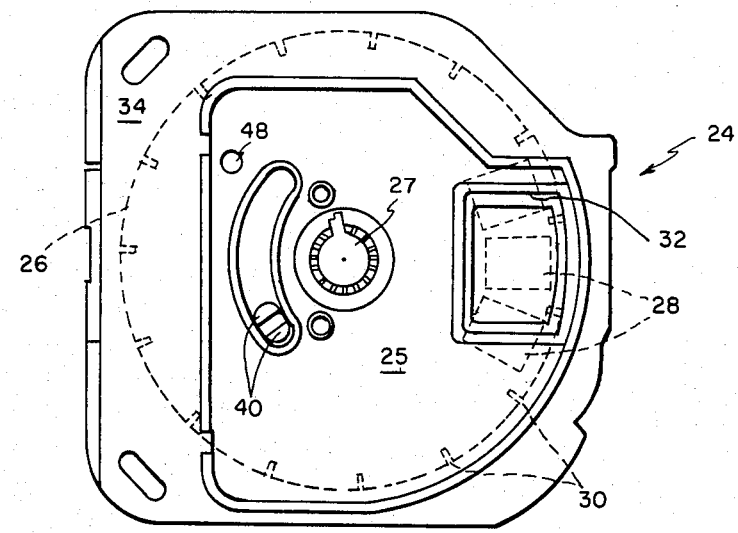
FIG. 4 is a front view of the film cartridge shown in FIG. 3.

A film cartridge 24 is shown in FIGS. 3 and 4 and, according to the teachings of the foregoing Sethi patent, comprises a generally flat light-tight plastic housing 25 enclosing a rotatable disk of film 26 provided with a central hub 27 that is accessible from the exterior of the housing. The film disk is provided with a plurality of uniformly spaced exposure regions 28 defined by previously exposing the surrounding portion of the film. Each of the exposure regions is associated with a corresponding adjacent metering notch 30, located along the edge of the film disk in a clockwise direction from the respective exposure region, as viewed in FIG. 4. An exposure window 32 in the front wall 34 of the cartridge housing 25 is provided with a cover slide 36 that is pivotably movable into and out of alignment with the exposure window by means of a slide operating pin 37 (FIG. 3) that extends through an arcuate slot 38 in the camera wall and is received between two studs 40 on the cover slide. The rear wall of the cartridge housing 25 includes a pressure plate member 44 in alignment with the exposure window 32 in the front wall. An exposure counter dial 46 on the corresponding face of the film disk hub 27 is also visible through the rear wall.

When the cartridge is loaded into the receiving chamber of the camera, a pin 47 in the camera enters light-tight opening 48 in the front cartridge wall and releases a locking device, not shown, that intially locks the cover slide 36 in alignment with window 32. Initially, as viewed in FIG. 3, the film disk is located in its extreme clockwise position, defined by the engagement of a hub ear with the lower edge of a cartridge ear. From this position the film disk initially must be rotated in a counterclockwise direction through an angle equal to approximately ⅓ the angle between adjacent image areas to bring the first available image area into exposure position. Similarly, when the film disk has rotated through somewhat less than 360 degrees to its extreme counterclockwise position, after exposure of all of the image areas, the engagement of the hub ear with the upper edge of the cartridge ear locates the last exposure area counterclockwise of the exposure window by an angle equal to approximately ⅓ the angle between successive exposure areas.

FIG. 3 shows the camera's rear loading door 22, which is hinged to the camera body at 70 and held in its closed position by a latch 72 and 73 that is releasable by means of lever 20. When the loading door is open, as shown in FIG. 3, the film cartridge 24 is insertable into cartridge chamber 74, in which the front wall 34 of the cartridge lies adjacent the rear surface of an intermediate camera wall 76, located rearwardly of the major components of the camera mechanism to which the present invention is directed. When the cartridge is loaded into the chamber 74, a film support frame member 82, aligned with the camera lens, is received in the exposure window 32 of the cartridge. A driving camera hub member 84 engages the hub 27 of the film disk, and the slide operating pin 37 engages the cover slide. Closing the cover door causes its spring members (not shown) to seat the cartridge against the intermediate wall member and brings a pressure applying member 90, supported by spring arms 92, into alignment with the cartridge pressure plate member 44. Latching of the door causes slide operating pin 37 to move the cover slide out of alignment with the exposure window so that the exposure region of the film disk can be supported against frame member 82 by the pressure plate under the influence of the pressure applying member 90. When the cover slide is open, a metering pawl tooth 98 extends through the exposure window and engages the metering notch 30 in the periphery of the film disk to control its incremental rotation. After the film disk has been exposed, the process by which the cover door is unlatched first withdraws the metering pawl tooth from the exposure window and moves the cover slide to close the exposure window. This occurs before the door can be opened, thereby preventing accidental light damage to the exposed film. As the cartridge is removed, the unlocking pin 47 withdraws from the cartridge opening 48, thus allowing the locking device to again lock the cover slide in its closed position. The foregoing is functionally similar to the mechanism used in commercial cameras.

Referring now to the exploded front view of FIG. 5, the front surface of the intermediate camera wall 76 provides the main mounting member for the camera mechanism components. The lens assembly 100 and the film support frame member 82 (FIG. 3) are constructed as a unitary structure to assure the requisite film-to-lens location and are mounted through an opening 101 in the intermediate camera wall 76.

The camera hub or film drive member 84 (FIG. 3) extends through an opening 103 in the intermediate camera wall 76 and is an integral part of and coaxial with a drive ratchet gear 102 on the forward side of the wall. An axial shaft having an intermediate diameter 106 and a reduced diameter 108 at the forward end extends forwardly of the ratchet gear 102, with the forward end being rotatably located in an opening (not shown) in a mechanism plate 112 overlying the intermediate wall 76 and the components thereon. The ratchet gear is provided with the same number of teeth as there are image areas on the film disk, 15 in the case of the presently commercially available film.

The front surface of the intermediate wall 76 is provided with locating posts 114 and 116 on which a short stroke lever 118 and a sensing lever 120, to be further described hereinbelow, are pivotally mounted. Cocking lever guide tracks 122 and 123 are also provided on the front surface of the intermediate wall, as are a platen pressure member guide track 124 and a metering member guide track and island, 126 and 128.

The metering pawl tooth 98 is carried at one end of a sickle-shaped metering pawl 130 which is pivotally supported by an axle 132 so that the tooth can be moved perpendicular to the intermediate wall 76. The pawl 130 is spring-loaded in the film-engaging position as by spring, not shown. The pawl 130 is provided with a foot portion 134 adjacent the ratchet gear 102 and a tab 136 overlying the island 128. (See FIG. 8.)

A platen pressure plunger member 138 (see FIG. 7), having an elongated pin portion 140 extending through the intermediate wall into engagement with the pressure applying member 90, is disposed at one end of the platen pressure member guide track 124 and is arranged for movement perpendicular to the intermediate wall under the influence of a platen pressure member 142.

The camera loading door latch 72 is operatively connected by a link 144 to the door release lever 20, which is pivotally connected to the intermediate wall 76. The door release lever 20 is also operatively connected by a link 148 to a dark slide lever 146. The dark slide lever includes the slide operating pin 37, which extends through, and is movable in, slot 38 in the intermediate wall 76. The dark slide lever encircles the hub member 84, between the ratchet gear 102 and the intermediate wall 76, and is arranged to move the dark slide operating pin 37 counterclockwise to close the cartridge dark slide as the door release lever 20 is rotated clockwise to release the camera loading door latch 72. The dark slide lever 146 is also provided with a cam surface 150 which is arranged to engage and depress the foot 134 of the metering pawl 130, thereby retracting the metering pawl tooth 98 from the metering notch 30 in the film disk to permit closure of the cartridge dark slide as the door release 20 lever is rotated clockwise.

A release member 152 is mounted on the intermediate diameter portion 106 of the ratchet gear shaft and is arranged for reciprocating pivotal motion thereon in opposite first and second directions. The release member carries and operates a cocking lever or member 154, a film advancing means such as film advance pawl 156, and film locating means such as the platen pressure member 142. The release member is arranged to move from its initial, at-rest position, illustrated in FIG. 5, in a first, counterclockwise direction, and then to return to the initial position when moved in a second, clockwise direction. The release lever 152 is also provided with pins 190 and 192 extending from the front surface thereof as well as with spring-anchoring caps 194 and 195. The release lever has a cam portion 196 engageable by a pin 198 on the front surface of the door release lever 20. A spring arm 200 is also provided on the release lever 152 which engages a post 202 on the intermediate wall 76 when the release member is in the extreme counterclockwise position.

The cocking lever or member 154 (see also FIG. 6) is pivotally mounted on the release member 152 and comprises cam portion 158 for engaging a shutter actuating means such as a high energy member or lever 220. The cocking member also includes a follower surface 160, a resilient follower arm 162, and a stop surface 164. The cocking lever is given a generally reciprocating motion by the release member, which motion is controlled by the follower surface 160 riding on guide track 122 and by the resilient follower arm 162 following guide track 123 on the intermediate wall 76.

The platen pressure member 142 is pivotally mounted on the release member 152 and is arranged for reciprocating motion along the intermediate wall 76 guided by track 124 between a first position and a second position. At the right-most extent of its travel, as viewed in FIG. 5, when the release member reaches the end of its counterclockwise motion, the end 166 of the platen pressure member is arranged to slide between the intermediate wall 76 and the pressure plunger member 138, lifting the plunger member away from wall 76 against the force of spring 168 and thereby withdrawing pin portion 140 from the pressure applying member 90. This is the first, film locating, position of the platen pressure member. The second position of the platen pressure member is a film releasing position and occurs when the end 166 disengages the pressure plunger member 138.

The film locating means also includes a metering arm member 170 carried by the platen pressure member 142. The metering member is movable between a first, film locating position and a second, film releasing position, and is arranged, on the rightward stoke as viewed in FIG. 5, to follow track 126 and be deflected downwardly around island 128. (See also FIG. 8.) At the end of the rightward stroke, the metering arm resiliently returns upward on the right side of island 128. The right side of the island is provided with a ramped surface 129. The metering member is normally in the first, film locating position except when, on the return, leftward stroke, the metering arm is pulled up the ramped surface over the island, engaging and lifting the tab 136 of the metering pawl 130, thereby withdrawing the metering pawl tooth 98 from the metering notch 30 in the film disk. As the leftward stroke continues, the metering arm drops off the left side of the island, returning to the first position at the end of the stroke.

The sensing lever or member 120, which is generally t-shaped, is pivotally mounted at the upper end on post 116 and is biased in a counterclockwise direction by a spring portion 117 integrally formed thereon. The lower end 172 of the sensing lever is normally spring biased into engagement with the film advance pawl 156 to urge the pawl into driving engagement with ratchet gear 102 of the film drive member. Surface 174 at the upper end of the sensing lever is arranged for engagement by a portion of the high energy lever 220 to disengage the lower end 172 from the advance pawl 156 at the appropriate time in the operational sequence.

The short stroke lever 118, which is generally L-shaped, is pivotally mounted on post 114 and is spring biased in a clockwise direction. The upper end of the short stroke lever is provided with a stop surface 176 which is arranged to engage stop surface 164 on the cocking lever 154 when the short stroke lever is biased in the clockwise direction. Pin 178 on the upper end of the short stroke lever engages the sensing lever 120, when the sensing lever is rotated clockwise, to rotate the short stroke lever counterclockwise, whereby the stop surface 176 is out of the path of the cocking lever 154. The lower end 180 of the short stroke lever is arranged, when in the extreme clockwise position to be engaged by surface 181 of the dark slide lever link 148 when the door release lever 20 is actuated.

The film advance member or pawl 156 is pivotally mounted on the release member 152 and comprises an arcuate member having a ratchet gear-engaging tooth 182. The advance pawl is normally biased out of engagement with the ratchet gear 102 by means of a spring 184. The advance pawl is also provided with an auxiliary operating arm 186. Ordinarily, the advance pawl 156 is urged into engagement with the ratchet gear 102 by the end 172 of the sensing lever 120 at the appropriate time in the operational sequence, as will be described hereinbelow. The auxiliary operating arm 186 is arranged for engagement by a cam surface 188 on the door release lever 20 as it is rotated counterclockwise to relatch the rear loading door 68.

The mechanism plate 112 overlies the release member 152 and its associated components and, as noted above, supports the end 108 of the ratchet gear shaft. The mechanism plate also aligns the front end of the lens assembly 100 and guide pins 205 of the platen pressure plunger member 138. A shutter blade guide track 206 is provided in the front of the mechanism plate in alignment with openings (not shown) in the lens assembly.

A shutter blade 210 is arranged for reciprocating motion in a shutter track 206 and is biased against the lower end of an anvil 212, above the lens assembly, by a spring 214. The upper end of the anvil is arranged to be struck by a hammer or shutter actuating portion 218 at one end of the high energy member or lever 220, which is fixed at the opposite end in the mechanism plate, and transmits the force to the shutter blade 210. The high energy lever 220 is formed of a high strength, highly resilient material, such as spring steel, and is provided with an ear 222 arranged to engage the cam portion 158 of the cocking lever 154. A tab 224 on the high energy lever is arranged to engage surface 174 of the sensing lever 120 when the high energy lever is cocked.

A collar 225 extending from the front surface of the mechanism plate 112 is disposed concentrically around shaft 108. An anti-creep spring 226 is coupled to shaft 108 with spring arms 228 engaging the inner surface of collar 225 to prevent the ratchet gear 102 from being rotated counterclockwise by friction between the release member 152 and the shaft 108.

A release lever spring 230 is tensioned between a cap 232 on the mechanism plate 112 and cap 194 on the release member 152 to urge the release member in the clockwise direction.

The back of the shutter button 16 is provided with a collar 236 which is arranged to drivingly engage pin 190 on the release lever 152.

The protective lens cover door 19 is disposed over the front end of the lens assembly 100 and is movable about a guiding pin 240, extending from the front of the mechanism plate, by pin 192 extending from the release lwcwe 152. The lens cover is provided with a slot 244 and a spring 246 which cooperate with the pin 192.

Operation of the Camera

In the operation of a loaded camera of the present invention (a description of the loading and unloading operation is presented hereinbelow), the user merely aims the camera via the viewfinder 14, depresses the shutter release button 16, and then releases the shutter button. When the shutter release button is depressed, the shutter is cocked, the film pressure plate engages the film and the shutter is actuated. When the shutter release button is released, the pressure plate disengages the film, the metering pawl is removed from the film metering notch, the film is advanced to the next frame, and the metering pawl engages the next film metering notch. A detailed description of the operation of the mechanism of the present invention follows.

When the shutter release button 16 is depressed, it rotates the release member 152 counterclockwise against the force of spring 230. The release member moves the lens cover door 19 from in front of the lens 12, and the cocking lever 154, guided by guide track 122, and through engagement of cam portion 158 with ear 222, cocks the high energy lever 220. As the high energy lever is cocked, i.e. as the hammer 218 is lifted from the end of the anvil 212, the tab 224 of the high energy lever engages the surface 174 of the sensing lever 120, urging it in the clockwise direction. This assures that the lower end 172 of the sensing lever is out of engagement with the advance pawl 156 so that no rotational force can be incidentally imparted to the film disk through the drive hub during the exposure sequence. The sensing lever also rotates the short stroke lever 118 counterclockwise by engaging the pin 178 on the upper end thereof, to move the stop surface 176 out of the path of the cocking lever.

At the same time, the platen pressure member 142 has been moved to the right (in FIG. 5) guided by track 124 until it has slid between the intermediate wall 76 and the pressure plunger member 138, withdrawing pin portion 140 from the pressure applying member 90 in the camera loading door 22. Thus, the pressure member is free to apply pressure to the pressure plate member 44 in the film cartridge, pressing the film against the film support frame member 82 and accurately locating the film in the exposure plane for optimum focus resolution. The metering arm member 170 has also been moved to the right along with the platen pressure member and, guided by the guide track 126 and island 128, is at the right side of the island ready to be pulled up the ramped surface when the release member 152 reverses direction.

The advance pawl 156, free of influence by the sensing lever, is urged away from the ratchet gear 102 by its spring 184 as it moves counterclockwise with the release member 152. The angular rotation of the release member between the rest position and the extreme counterclockwise position is just sufficient to position the advance pawl adjacent the next ratchet gear tooth so that, on the return stroke, the gear is advanced by one tooth, to move the film disk by one frame.

Toward the end of the counterclockwise motion of the release member 152, the spring arm 200 thereon engages post 202 to provide a counteracting force to offset the shock of the release of the high energy lever as the ear 222 falls off the cam portion 158 of the cocking lever 154. This assures that the camera user does not feel a change in spring force on the shutter button as the high energy lever force is removed, which could generate unwanted camera shake just as the shutter is opened.

The position of the camera mechanism illustrated in FIG. 8 is just prior to the release of the high energy lever. It is at this position that the camera user still has the option of whether or not to expose the film. If he chooses not to make the exposure, he may release the shutter button, and the camera mechanism returns to the "at-rest" condition without any portion thereof, such as springs, etc., being placed under stress until an exposure is actually made.

If the user choses to make the exposure, he merely continues to press the shutter button causing the release member to rotate to the end of its counterclockwise motion, pulling the cocking lever 154 to the left and causing the ear 222 of the high energy lever 220 to fall off the cam portion 158. The energy stored in the cocked high energy lever drives the hammer 218 against the upper end of anvil 212 which transmits the energy to the shutter blade 210, driving it down against the force of spring 214. The energy imparted to the shutter blade relative to the mass and length of the shutter blade and the force of spring 214 is sufficient to drive the end of the shutter blade beyond the aperture of the lens assembly 100 for a time sufficient to provide the desired exposure, after which the spring 214 returns the shutter blade to the starting position, closing the exposure aperture.

After making the exposure, the user releases the shutter button 16, and the release lever spring 230 acts upon the release lever 152 to rotate it clockwise and to also return the shutter button to its initial position. As the release member 152 commences the clockwise movement, the platen pressure member 142 is moved to the left and is withdrawn from between the intermediate wall 76 and the pressure plunger member 138. Accordingly, pin portion 140 is pushed by spring 168 into engagement with the pressure applying member 90 in the camera door 22, thereby relieving the pressure on the pressure plate member 44 in the film cartridge. At the same time, the metering arm member 170 is pulled up the ramp surface 129 of island 128, engaging the tab 136 (FIG. 5) of the metering pawl 130, thereby withdrawing the metering pawl tooth 98 from engagement with the metering notch 30 in the film disk. At this point substantially all restraining forces have been removed from the film disc so that it is free to be advanced to the next frame.

When the ear 222 of the high energy lever 220 drops off the cam portion 158 of the cocking lever 154, the high energy lever tab 224 disengages the sensing lever 120, permitting it to rotate counterclockwise under the influence of its spring portion 117, urging its lower end 172 into engagement with the advance pawl 156 and bringing the tooth 182 into engagement with the ratchet gear 102. At this time the film disc has started to rotate, and the metering arm member 170 drops off the left side of the island, permitting the metering pawl tooth to ride on the surface of the film disk. Thus, as movement of the release member 152 continues in the clockwise direction, the ratchet gear 102 is advanced via engagement with the advance pawl 156 and rotates the film disk to the next exposure position at which point the metering pawl tooth 98 engages the next film notch to locate the disk for the next exposure.

After disengaging the high energy lever 220, the cam portion 158 of the cocking lever 154 rides up and over the high energy lever ear 222 until it returns to the rightmost position and is pushed downwardly off the ear to its original position by the resilient follower arm 162. Inasmuch as the cocking lever is above the high energy lever during the return stroke, there is no possibility of inadvertent actuation of the high energy lever by any downward movement of the shutter button during the return motion.

After the sensing lever has been spring-biased into engagement with the advance pawl 156, the short stroke lever 118 is spring biased in a clockwise direction and rests upon the top surface of the cocking lever 154 until the stop surface 176 engages the stop surface 174 on the cocking lever. The relative positions of these stop surfaces are such that engagement occurs during the final portion of the return stroke and prevents the release lever from being reversed, eliminating the possibility of the re-engagement of the advance pawl with the next tooth on the ratchet gear 102. Thus, the camera operator is prevented from inadvertently advancing more than one frame of film at a time. As the cocking member returns to its initial position, the cocking lever cam 158 drops off the ear 222 of the high energy lever 220, and the next exposure sequence may be commenced. This is effectuated because, as the cocking lever is subsequently moved to the left, it again re-engages the high energy lever which engages the sensing lever 120 and in turn lifts the short stroke lever 119, removing it from the path of the cocking lever. The return of the mechanism to the initial position completes the cycle and also closes the lens cover door 19, protecting the lens until the next exposure is made.

After exposing the 15th, and final, film frame of a cartridge, the film advance mechanism commences to advance the film disk but is stopped in mid-stroke. This results from the engagement of the film hub ear with the cartridge ear as described above, signifying the complete exposure of that film cartridge. Full return of the release member 152 in the clockwise direction is prevented by the blocking of further rotation of the disk by engagement of the hub ear with the upper edge of the cartridge ear. The shutter button is likewise stopped before it returns to its "at rest" position. However, the clockwise motion of the release lever is sufficient to permit the short stroke lever 118 to engage the cocking lever 154 to prevent the shutter button from being depressed again. Thus, the shutter button is locked in an intermediate position indicating to the camera user that the last film frame of the cartridge has been exposed and that the cartridge must be removed for processing. The clockwise motion of the release lever is also sufficient to return the lens cover to the closed position to protect the lens should the user not immediately replace the exposed film cartridge. This results from the cooperation of the configuration of the slot 244 and the spring 246 and their cooperation with the pin 192 on the release lever.

Unloading and Loading

The camera user then opens the camera to remove the exposed film cartridge and replace it with a fresh, unexposed film cartridge. As the door release lever 20 is rotated clockwise, the following operations occur simultaneously: the dark side link 148 rotates the dark slide lever 146 counterclockwise; pin 198 on the front surface of the door release lever engages the cam portion 196 of the release lever 152 and cam surface 181 of the dark slide link 148 engages the lower end 180 of the short stroke lever 118. As the dark slide lever 146 is rotated counterclockwise, the dark slide operating pin 37 closes the dark slide of the cartridge. At the same time, the cam surface 150 of the dark slide lever engages and depresses the foot 134 (FIG. 5) of the metering pawl 130, to retract the metering tooth from the metering notch of the film disk, clearing the way for the closure of the dark side. This all occurs before the loading door latch 72 (FIG. 5) is actuated to release the rear loading door 22 (FIG. 3). The short stroke lever 118 is moved counterclockwise by engagement with the dark slide link cam surface 181 to remove the stop surface 176 out of the path of the cocking lever 154 so that the release member 152 may be rotated counterclockwise by the door release lever. This is necessary because the cocking lever is still above the high energy lever 220 after the advance of the film disk was interrupted because the final film frame in the disk cartridge had been exposed.

Figure 10:
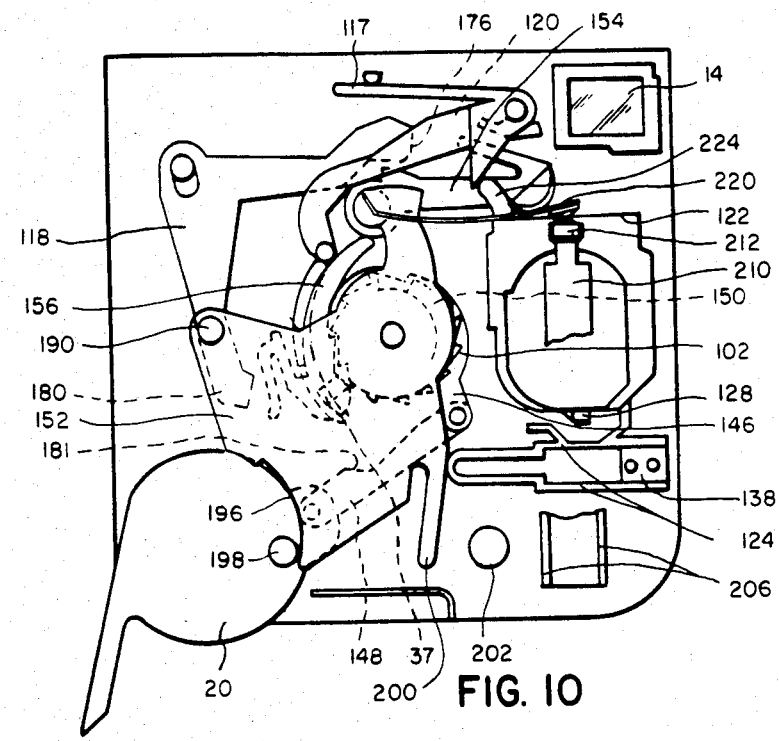
FIG. 10 is a view of a portion of the camera with the loading door latch released after exposure of a complete disk.

At this point, the camera mechanism is as illustrated in FIG. 10 and the loading door has been released to permit removal of the exposed cartridge and insertion of a new cartridge.

After insertion of a new film cartridge into the camera, the rear door is closed, and engaged by the latch 72, permitting the door release lever 20 to rotate counterclockwise. As this occurs, the dark slide lever 146 is rotated clockwise, opening the dark slide in the new film cartridge and disengaging the metering pawl 130. At the same time, the advance pawl 156 is urged into engagement with the ratchet gear 102 by the sensing lever 120. Accordingly, the ratchet gear is rotated by the return of the release lever in the clockwise direction to advance the film disk to bring the first frame into alignment with the camera lens where the metering pawl tooth engages the metering notch for that frame of film. At that point, the camera mechanism has returned to the initial "at-rest" position, ready for exposure of the first frame.

Figure 11:
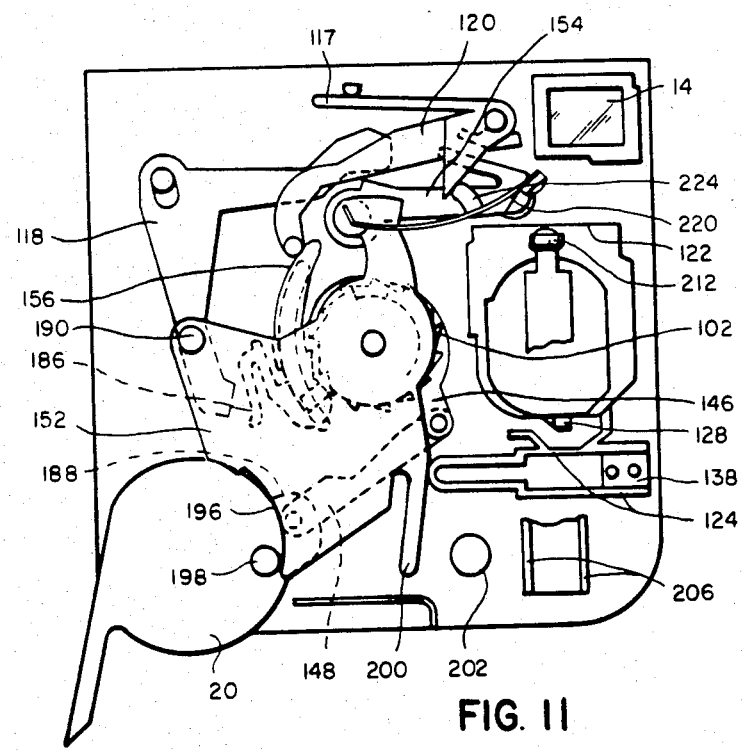
FIG. 11 is a view of a portion of the camera with the loading door latch released after less than complete exposure of a disk.

While the foregoing unloading and loading operation has been described with respect to fully exposed and completely unexposed film cartridges, the same operations occur with partially exposed cartridges without risk of loss of a previously exposed frame or mechanical jamming of the camera. In this situation, as illustrated in FIG. 11, since the preceding camera operation would not have been interrupted in mid-cycle, the cocking lever 154 would partially cock the high energy lever 220 as the release member 152 is rotated counterclockwise by the door release lever 20. At the same time, the dark slide lever 146 closes the dark slide and retracts the metering tooth from the disk, as described above. Because the high energy lever is partially cocked, the sensing lever 120 is rotated clockwise by the high energy lever tab 224, removing the force on the advance pawl 156 and moving the short stroke lever 118 out of the path of the cocking lever. Accordingly, after the new cartridge has been loaded into the camera and the rear door is closed, as the door release lever 20 is returned to the closed position, the cam surface 188 thereof engages the auxillary operating arm 186 on the advance pawl 156 to move it into engagement with the ratchet gear 102 so that the new film disk will be initially rotated to bring the first image area into exposure position.

Alternative Embodiments

While the present invention has been described with respect to a preferred embodiment, it will be appreciated that variations in portions of the structure may be employed without departing from the concept of the invention.

For example, while an impact shutter actuated by a high energy lever has been illustrated, it will be understood that other types of shutters may be employed. For example, a simple two-blade shutter may be employed actuated by the release member when it is moved in the first direction and recocked by the release member when it is moved in the opposite direction. Similarly, a single-blade shutter can be employed with a capping blade in place of the impact shutter. In this case, the capping blade can also function as, or in place of, the lens cover.

Similarly, the impact shutter can be modified by omitting the anvil 212 so that the hammer 218 of the high energy lever directly engages the end of the shutter blade 210. Also, the anvil can be replaced by a piezo crystal which, when struck by the high energy lever, provides energy for a flash lamp (not shown). Still further, in the absence of the piezo crystal, the high energy lever and the anvil can function as a flash synchronizing switch to fire an external flash (not shown). Likewise, another form of flash synchronizing switch may be provided, as is well known in the art.

In another embodiment, the shutter button 16 can be connected to the release member 152 by a spring member in place of the collar 236 and pin 190. With this construction, the forcing of the shutter button to the "at rest" position, for example after exposure of the fifteenth frame, would merely tension that spring and would not damage the camera mechanism.

Accordingly, the present invention provides a simple, compact camera for use with a film disk that provides one-button operation while enabling the photographer to discontinue taking a photograph after once starting, without jamming the mechanism or placing it under stress for some indeterminate time. The mechanism is formed of a minimum of simple, inexpensive parts and yet provides all of the functions of more complex, more expensive cameras.

The invention has been described with reference to specific embodiments and variations, but it should be apparent that other modifications and variations can be made within the spirit and scope of the invention, which is defined by the following claims.

What is claimed is:

1. In a disk camera having a shutter, cockable and releasable shutter actuating means, film advancing means, and film locating means movable between a film locating position and a film releasing position, the improvement comprising:
   a release member arranged for movement in opposite first and second directions, said release member arranged, when moved in said first direction, to first cock said shutter actuating means and to move said film locating means into said film locating position and then to release said shutter actuating means to actuate said shutter; and
   said release member, when moved in said second direction, arranged to move said film locating means into said film releasing position and then to actuate said film advancing means.

2. The invention according to claim 1 wherein said shutter actuating means is a high energy member fixed at one end and having a shutter actuating portion at the opposite end.

3. The invention according to claim 1 wherein said film advancing means includes a film advance pawl operatively connected to said release member and a film drive member engageable by said film advance pawl.

4. A camera comprising:
   a film chamber arranged to receive a film element;
   a shutter means;
   a film advance member;
   a metering member and a platen pressure member, both movable between first positions and second positions, said first position of said platen pressure member being a film locating position and said second position being a film releasing position, said first position of said metering member being a film engaging position and said second position being a film disengaging position;
   a shutter actuating means comprising a cockable and releasable high energy member fixed at one end and having a shutter actuating portion at the opposite end;
   a cocking member arranged to engage the high energy member to cock said shutter actuating portion;
   a film drive member engageable by said film advance member and arranged to move a film element in said chamber;
   a release member supported for movement in opposite first and second directions, said release member being operatively connected to said cocking member and to said platen pressure member for moving said cocking lever in a first direction with respect to said high energy member to cock said shutter actuating portion while moving said platen pressure member into said first position and then for releasing said high energy member to actuate said shutter when said release member is moved in said first direction;
   means operatively connecting said release member to said metering member for moving said metering member and said platen pressure member into said second positions when said release member is moved in said second direction after actuation of said shutter means; and
   means operatively connecting said release member to said film advance member to engaging said drive member with said film advance member to advance the film after said platen pressure member and said metering member have moved to the second positions, and then to move said metering member into said first position.

5. The invention according to claim 4 wherein said camera is provided with a film chamber closure door, a door-retaining latch, and means for releasing said latch, said means for releasing said latch arranged to move said platen pressure member and said metering member to said second positions when said latch is released.

6. A camera comprising:
   a film chamber arranged to receive a film element;
   a shutter means;
   a metering member and a platen pressure member, both movable between first positions and second positions, said first position of said platen pressure member being a film locating position and said second position being a film releasing position, said first position of said metering member being a film engaging position and said second position being a film disengaging position;

a film advance means arranged to move a film element in said chamber;

a release member supported for movement in opposite first and second directions, said release member being operatively connected to said shutter means and to said platen pressure member for moving said platen pressure member into said first position and then for actuating said shutter means when said release member is moved in said first direction;

means operatively connecting said release member to said metering member for moving said metering member and said platen pressure member into said second positions when said release member is moved in said second direction after actuation of said shutter means; and means operatively connecting said release member to said film advance means for advancing the film after said platen pressure member and said metering member have moved to the second positions, and then to move said metering member into said first position.

7. A camera comprising:
a film chamber arranged to receive a film element;
a shutter means;
a film advance means;
a metering member and a platen pressure member, both movable between first positions and second positons, said first position of said platen pressure member being a film locating position and said second position being a film releasing position, said first position of said metering member being a film engaging position and said second position being a film disengaging position;

a film drive member engageable by said film advance means and arranged to move a film element in said chamber;

a release member supported for movement in opposite first and second directions, said release member being operatively connected to said shutter means and to said platen pressure member for moving said platen pressure member into said first position and then for actuating said shutter means when said release member is moved in said first direction;

means operatively connecting said release member to said metering member for moving said metering member and said platen pressure member into said second postions when said release member is moved in said second direction after actuation of said shutter means; and means operatively connecting said release member to said film advance means for engaging said drive member with said film advance means to advance the film after said platen pressure member and said metering member have moved to the second positions, and then to move said metering member into said first position.

8. The invention according to claim 7 wherein said camera is provided with a film chamber closure door, a door-retaining latch, and means for releasing said latch, said means for releasing said latch arranged to move said platen pressure member and said metering member to said second positions when said latch is released.

* * * * *